United States Patent
Zauner et al.

(10) Patent No.: US 10,767,745 B2
(45) Date of Patent: Sep. 8, 2020

(54) PULLEY FOR A CONTINUOUSLY VARIABLE TRANSMISSION

(71) Applicant: BRP-ROTAX GMBH & CO. KG, Gunskirchen (AT)

(72) Inventors: Gunther Zauner, St. Willibald (AT); Thomas Schneck, Linz (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 223 days.

(21) Appl. No.: 15/871,459

(22) Filed: Jan. 15, 2018

(65) Prior Publication Data

US 2018/0202533 A1 Jul. 19, 2018

Related U.S. Application Data

(60) Provisional application No. 62/446,575, filed on Jan. 16, 2017.

(51) Int. Cl.
*F16H 55/56* (2006.01)
*F16H 9/18* (2006.01)
*B62M 27/02* (2006.01)

(52) U.S. Cl.
CPC ............ *F16H 55/563* (2013.01); *F16H 9/18* (2013.01); *F16H 55/56* (2013.01); *B62M 27/02* (2013.01)

(58) Field of Classification Search
CPC ............................. F16H 55/563; F16H 63/067
See application file for complete search history.

(56) References Cited

U.S. PATENT DOCUMENTS 3,759,111 A 9/1973 Hoff et al.
4,634,405 A * 1/1987 Quick .................. F16H 55/563
29/892.1

(Continued)

FOREIGN PATENT DOCUMENTS

JP 2012219906 A 11/2012
WO 2013032463 A2 3/2013
WO WO2015151033 A1 * 8/2015

OTHER PUBLICATIONS

European Search Report in connection with the corresponding European Patent Application No. 18151752; Vasilis Hassiotis; dated May 7, 2018.

(Continued)

*Primary Examiner* — Minh Truong
(74) *Attorney, Agent, or Firm* — BCF LLP

(57) ABSTRACT

A pulley for a CVT has a fixed sheave, a movable sheave, a spider, a biasing member biasing the movable sheave axially away from the fixed sheave, at least one centrifugal actuator and at least one roller assembly. The at least one centrifugal actuator has an arm pivotally connected to one of the movable sheave and the spider. The arm has a thrust portion pushing against a track portion of a roller of the at least one roller assembly upon rotation of the CVT, the roller being rotationally connected to another one of the movable sheave and the spider. The roller receives the thrust portion of the arm on the track portion thereof such that the thrust portion of the arm remains in contact with the track portion of the roller. The arm and the roller thereby transfer axial and rotational forces between the spider and the movable sheave.

19 Claims, 13 Drawing Sheets

(56) References Cited

U.S. PATENT DOCUMENTS

| | | | | |
|---|---|---|---|---|
| 5,647,810 | A * | 7/1997 | Huddleston | F16C 13/006 |
| | | | | 192/105 CD |
| 9,057,432 | B1 | 6/2015 | Bouffard et al. | |
| 9,267,580 | B2 * | 2/2016 | Aitcin | F16H 9/125 |
| 9,500,264 | B2 | 11/2016 | Aitcin et al. | |
| 9,593,759 | B2 * | 3/2017 | Millard | F16H 55/563 |
| 9,933,064 | B2 | 4/2018 | Aitcin et al. | |
| 2003/0221890 | A1 * | 12/2003 | Fecteau | B62J 1/12 |
| | | | | 180/210 |
| 2014/0004984 | A1 * | 1/2014 | Aitcin | F16H 55/56 |
| | | | | 474/14 |
| 2016/0069434 | A1 * | 3/2016 | Aitcin | F16H 9/14 |
| | | | | 180/190 |

OTHER PUBLICATIONS

English abstract of JP2012219906A retrieved from https://worldwide.espacenet.com/ on Apr. 9, 2018.

* cited by examiner

PULLEY FOR A CONTINUOUSLY VARIABLE TRANSMISSION

CROSS-REFERENCE TO RELATED APPLICATION

The present application claims priority to U.S. Provisional Patent Application Ser. No. 62/446,575, filed Jan. 16, 2017, entitled "Pulley for a Continuously Variable Transmission", which is incorporated by reference herein in its entirety.

TECHNICAL FIELD

The present technology relates to a pulley for a continuously variable transmission.

BACKGROUND

Conventional snowmobile powertrains incorporate a continuously variable transmission (CVT) having a primary pulley that is operatively coupled to the engine driving shaft and a secondary pulley coupled to a driven shaft. The primary pulley transfers torque to the secondary pulley via a drive belt looped around both pulleys. Typically, the driven shaft is a transverse jackshaft which drives the input member of a chain and sprocket reduction drive. The output of the reduction drive is coupled to one end of an axle on which are located the drive track drive sprocket wheels.

The primary pulley includes centrifugal actuators through which the drive ratio of the primary pulley is varied progressively as a function of the engine speed. The centrifugal actuators are connected to a movable sheave of the primary pulley. The primary pulley also includes a fixed sheave which is axially fixed. The fixed sheave and the movable sheave are rotatable together. The movable sheave is movable axially toward the fixed sheave by the action of the centrifugal actuators and away from the fixed sheave by a biasing spring. The centrifugal actuators generally consist of centrifugal weights in the form of adjusting arms. Each arm is connected to the movable sheave of the primary pulley by a pin, and pivots outwards about its corresponding pin. As they pivot, the arms are in contact with corresponding rollers disposed on a spider fixed relative to the fixed sheave. When the adjusting arms pivot outwards as a result of centrifugal force, the adjusting arms slide against their corresponding roller and the axially movable sheave is pushed towards the fixed sheave.

Axial displacement of the moveable sheave relative to the fixed sheave is provided by the spider, the adjusting arms and the rollers described above. Torque transmission between the fixed and moveable sheaves is provided by separate parts or mechanisms. As a result, axial displacement and torque transmission are provided by functionally separate parts. The use of these separate parts increases the cost and weight of the primary pulley.

Therefore, there is a desire for a pulley for a continuously variable transmission having parts that allow for both axial displacement of the movable sheave and transmission of torque between the movable sheave and the spider, while reducing the cost and weight of the pulley.

SUMMARY

It is an object of the present to ameliorate at least some of the inconveniences present in the prior art.

According to an aspect of the present technology, there is provided a pulley for a continuously variable transmission. The pulley includes a fixed sheave having an axis of rotation, a movable sheave axially movable relative to the fixed sheave, a spider axially fixed relative to the fixed sheave and rotationally fixed relative to the movable sheave, the movable sheave being disposed axially between the spider and the fixed sheave, a biasing member biasing the movable sheave axially away from the fixed sheave, at least one centrifugal actuator including an arm pivotally connected to one of the movable sheave and the spider, the arm pivoting away from the one of the movable sheave and the spider as a speed of rotation of the pulley increases, the arm having a thrust portion pushing against another one of the movable sheave and the spider as the arm pivots away from the one of the movable sheave and the spider, thereby moving the movable sheave axially toward the fixed sheave, the arm having a first outer profile at the thrust portion, and at least one roller assembly including a roller rotationally connected to another one of the movable sheave and the spider, the roller having a track portion having a second outer profile complementary to the first outer profile, the roller receiving the thrust portion of the arm on the track portion such that the thrust portion of the arm remains in contact with the track portion of the roller, the arm and the roller thereby transferring axial and rotational forces between the spider and the movable sheave.

In some implementations, the thrust portion of the arm has at least one contact point with the track portion of the roller.

In some implementations, the thrust portion of the arm has two contact points with the track portion of the roller.

In some implementations, the thrust portion of the arm remains generally centered on the track portion of the roller.

In some implementations, the first outer profile of the thrust portion of the arm is convex, and the second outer profile of the track portion of the roller is concave.

In some implementations, a cross section of the first outer profile of the thrust portion of the arm, taken along a first plane parallel to a pivot axis of the arm, has a generally parabolic shape, and a cross section of the second outer profile of the track portion of the roller, taken along a second plane containing a rotation axis of the roller, has a generally parabolic shape.

In some implementations, each of the at least one roller assembly further includes an axle extending through the roller for connecting the at least one roller assembly to the other one of the moveable sheave and the spider.

In some implementations, for each of the at least one roller assembly, the axle is a hollow axle having a threaded inner portion, and at least one screw engages the threaded inner portion of the axle for connecting the axle to the other one of the moveable sheave and the spider.

In some implementations, for each of the at least one roller assembly, the axle has a threaded outer portion, and a nut engages the threaded outer portion of the axle for connecting the axle to the other one of the moveable sheave and the spider.

In some implementations, the arm includes a hollow cylindrical portion perpendicularly connected to the thrust portion.

In some implementations, the pulley further includes a pin extending through the hollow cylindrical portion of the arm for pivotally connecting the arm to the one of the moveable sheave and the spider.

In some implementations, the thrust portion of the arm is longitudinally curved.

In some implementations, the thrust portion has an end portion engaging the track portion of the roller when the arm is fully pivoted away from the one of the movable sheave and the spider.

In some implementations, the spider defines an aperture, and the end portion of the arm extends through the aperture at least when the movable sheave is fully axially moved away from the fixed sheave.

In some implementations, the pulley further includes a damper connecting the fixed sheave to the spider and transferring the rotational forces between the fixed sheave and the spider.

In some implementations, the arm is pivotally connected to the movable sheave, and the roller is rotationally connected to the spider.

In some implementations, the at least one centrifugal actuator is three centrifugal actuators disposed at 120 degrees from each other, the at least one roller assembly is three roller assemblies disposed at 120 degrees from each other, and each of the three centrifugal actuators is aligned with a corresponding one of the three roller assemblies.

In some implementations, the pulley further includes a fixed sheave shaft connected to the fixed sheave, and a movable sheave shaft connected to the movable sheave, the fixed sheave shaft being disposed at least in part inside the movable sheave shaft. The movable sheave shaft is disposed at least in part inside the biasing member and the biasing member is disposed at least in part inside the spider.

In accordance with another aspect of the present technology, there is provided a continuously variable transmission including the pulley as described above, the pulley being a primary pulley, a secondary pulley having a fixed sheave, and a movable sheave axially movable relative to the fixed sheave, and a drive belt looped around the fixed and movable sheaves.

In some implementations, no clamping force is applied to the drive belt by at least one of the fixed and moveable sheaves when the movable sheave is fully axially moved away from the fixed sheave.

In accordance with yet another aspect of the present technology, there is provided a vehicle including a frame, a motor connected to the frame, the continuously variable transmission as described above, the primary pulley being operatively connected to and driven by the motor, a driven shaft connected to and driven by the secondary pulley, and at least one ground engaging member operatively connected to the driven shaft.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Should there be any difference in the definitions of term in this application and the definition of these terms in any document included herein by reference, the terms as defined in the present application take precedence.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

A pulley for a continuously variable transmission (CVT) will be described with respect to a snowmobile 10. However, it is contemplated that the pulley could be used in a CVT for other vehicles, such as, but not limited to, on-road vehicles, off-road vehicles, a motorcycle, a scooter, a three-wheel road vehicle and an all-terrain vehicle (ATV). It is also contemplated that the CVT could be used in devices other than vehicles.

Figure 1:
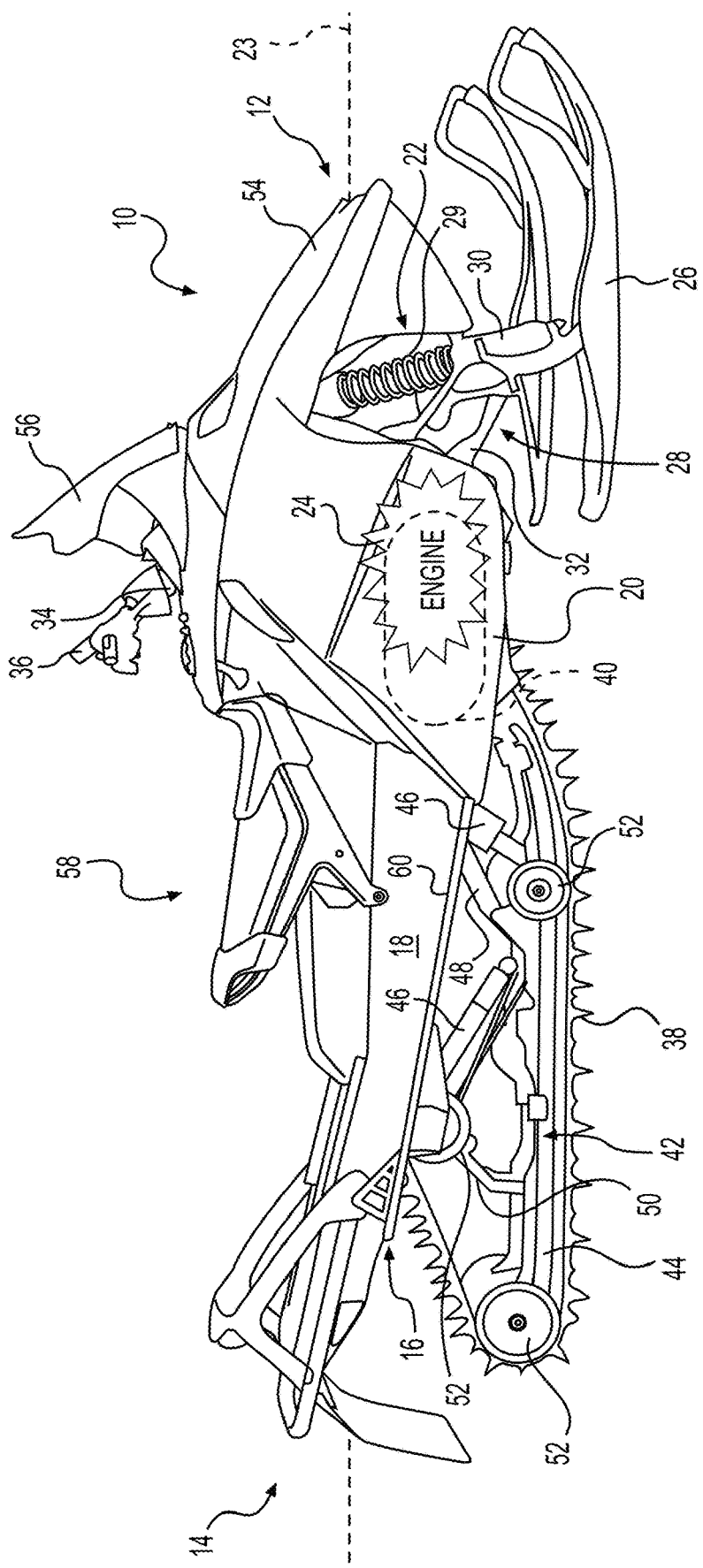
FIG. 1 is a right side perspective view of a snowmobile.

Turning now to FIG. 1, a snowmobile 10 includes a forward end 12 and a rearward end 14 that are defined consistently with a forward travel direction of the snowmobile 10. The snowmobile 10 includes a frame 16 that includes a tunnel 18, a motor cradle portion 20 and a front suspension assembly portion 22. The tunnel 18 consists of one or more pieces of sheet metal arranged to form an inverted U-shape that is connected at the front to the motor cradle portion 20 and extends rearward therefrom along the longitudinal axis 23. A motor, which in the present implementation is an internal combustion engine 24 (schematically illustrated in FIG. 1), is carried by the motor cradle portion 20 of the frame 16. The internal construction of the engine 24 may be of any known type such as a two-stroke engine, a four-stroke engine or a diesel engine. It is contemplated that the engine 24 could be replaced by other types of motors, such as, but not limited to, an electric motor or an electric/internal combustion engine hybrid. Two skis 26 are positioned at the forward end 12 of the snowmobile 10 and are attached to the front suspension assembly portion 22 of the frame 16 through front suspension assemblies 28. Each front suspension assembly 28 includes a shock absorber assembly 29, a ski leg 30 and supporting arms 32. Ball joints and steering rods (not shown) operatively connect the skis 26 to a steering column 34. A steering device in the form of a handlebar 36 is attached to the upper end of the steering column 34 to allow a driver to rotate the ski legs 30 and thus the skis 26, in order to steer the snowmobile 10.

An endless drive track 38 is disposed generally under the tunnel 18 and is operatively connected to the engine 24 through a CVT 40 (schematically illustrated by broken lines in FIG. 1) which will be described in greater detail below. The endless drive track 38 is driven to run about a rear suspension assembly 42 for propulsion of the snowmobile 10. The rear suspension assembly 42 includes a pair of slide rails 44 in sliding contact with the endless drive track 38. The rear suspension assembly 42 also includes a plurality of shock absorbers 46 which may further include coil springs (not shown) surrounding the shock absorbers 46. Suspension arms 48 and 50 are provided to attach the slide rails 44 to the frame 16. A plurality of idler wheels 52 are also provided in the rear suspension assembly 42. Other types and geometries of rear suspension assemblies are also contemplated.

At the forward end 12 of the snowmobile 10, fairings 54 enclose the engine 24 and the CVT 40, thereby providing an external shell that protects the engine 24 and the CVT 40. The fairings 54 include a hood and one or more side panels that can be open to allow access to the engine 24 and the CVT 40 when this is required, for example, for inspection or maintenance of the engine 24 and/or the CVT 40. A windshield 56 is connected to the fairings 54 near the forward end 12 of the snowmobile 10. Alternatively the windshield 56 could be connected directly to the handlebar 36. The windshield 56 acts as a wind screen to lessen the force of the air on the driver while the snowmobile 10 is moving forward. A straddle-type seat 58 is positioned over the tunnel 18. Two footrests 60 are positioned on opposite sides of the snowmobile 10 below the seat 58 to accommodate the driver's feet.

Figure 2:
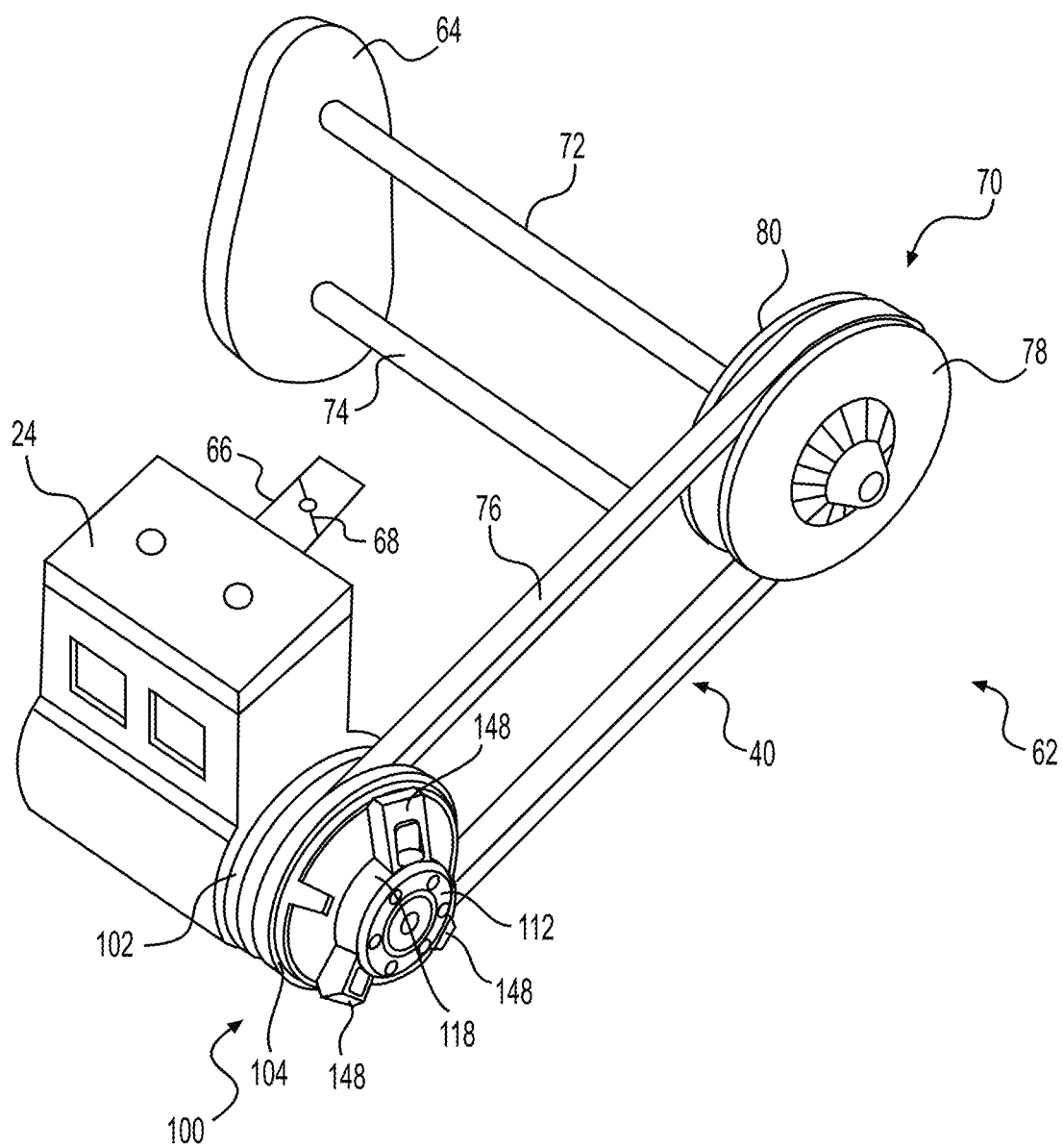
FIG. 2 is schematic representation of a perspective view, taken from a front, left side, of a powertrain of the snowmobile of FIG. 1.

FIG. 2 schematically illustrates a powertrain 62 of the snowmobile 10. The powertrain 62 includes the engine 24, the CVT 40 and a fixed ratio reduction drive 64. A throttle body 66 having a throttle valve 68 therein is connected to air intake ports of the engine 24 to control the flow of air to the engine 24. It is contemplated that the throttle body 66 could be replaced by a carburetor. The engine 24 drives a crankshaft (not shown) that rotates about a horizontally disposed axis that extends generally transversely to the longitudinal axis 23 of the snowmobile 10. The crankshaft drives the CVT 40 for transmitting torque to the endless drive track 38 for propulsion of the snowmobile 10. The CVT 40 includes a primary pulley 100 coupled to the crankshaft to rotate with the crankshaft of the engine 24 and a secondary pulley 70 coupled to one end of a transversely mounted jackshaft 72 that is supported on the frame 16 through bearings. The opposite end of the transversely mounted jackshaft 72 is connected to the input member of the reduction drive 64 and the output member of the reduction drive 64 is connected to a drive axle 74 carrying sprocket wheels (not shown) that form a driving connection with the drive track 38.

The primary pulley 100 of the CVT 40 includes a pair of opposed frustoconical belt drive sheaves 102 and 104 between which a drive belt 76 is located. The drive belt 76 is made of rubber, but it is contemplated that it could be made of metal linkages or of a polymer. The primary pulley 100 will be described in greater detail below. The secondary pulley 70 includes a pair of frustoconical belt drive sheaves 78 and 80 between which the drive belt 76 is located. The drive belt 76 is looped around both the primary pulley 100 and the secondary pulley 70. The torque (or rotational efforts) being transmitted to the secondary pulley 70 provides the necessary clamping force on the drive belt 76 through its torque sensitive mechanical device in order to efficiently transfer torque to the other powertrain components.

In the present implementation, the primary pulley 100 rotates at the same speed as the crankshaft of the engine 24 whereas the speed of rotation of the transversely mounted jackshaft 72 is determined in accordance with the instantaneous ratio of the CVT 40, and the drive axle 74 rotates at a lower speed than the transversely mounted jackshaft 72 because of the action of the reduction drive 64. The input member of the reduction drive 64 consists of a small sprocket connected to the transversely mounted jackshaft 72 and coupled to drive an output member consisting of a larger sprocket connected to the drive axle 74 through a driving chain, all enclosed within the housing of the reduction drive 64.

It is contemplated that the primary pulley 100 could be coupled to an engine shaft other than the crankshaft, such as an output shaft, a counterbalance shaft, or a power take-off shaft driven by the engine 24. The shaft driving the primary pulley 100 is therefore generally referred to herein as the driving shaft. Similarly, it is contemplated that the secondary pulley 70 could be coupled to a shaft other than the transversely mounted jackshaft 72, such as directly to the drive axle 74 or any other shaft operatively connected to the propulsion element of the vehicle (i.e. the drive track 38 in the case of the snowmobile 10). The shaft driven by the secondary pulley 70 is therefore generally referred to herein as the driven shaft.

Turning now to FIGS. 3 to 11, the primary pulley 100 will be described in more detail. As discussed above, the primary pulley 100 includes a pair of opposed frustoconical belt drive sheaves 102 and 104. Both sheaves 102 and 104 rotate together with the driving shaft. The sheave 102 is fixed in an axial direction relative to the driving shaft, and is therefore referred to as the fixed sheave 102. The fixed sheave 102 is also rotationally fixed relative to the driving shaft. The sheave 104 can move toward or away from the fixed sheave 102 in the axial direction of the driving shaft in order to change the drive ratio of the CVT 40, and is therefore referred to as the movable sheave 104. As can be seen in FIG. 2, the fixed sheave 102 is disposed between the movable sheave 104 and the engine 24. As would be understood from FIG. 6, when the movable sheave 104 is fully axially moved away from the fixed sheave 102, no clamping force is applied to the drive belt 76 by the fixed and/or moveable sheaves 102, 104.

Figure 3:
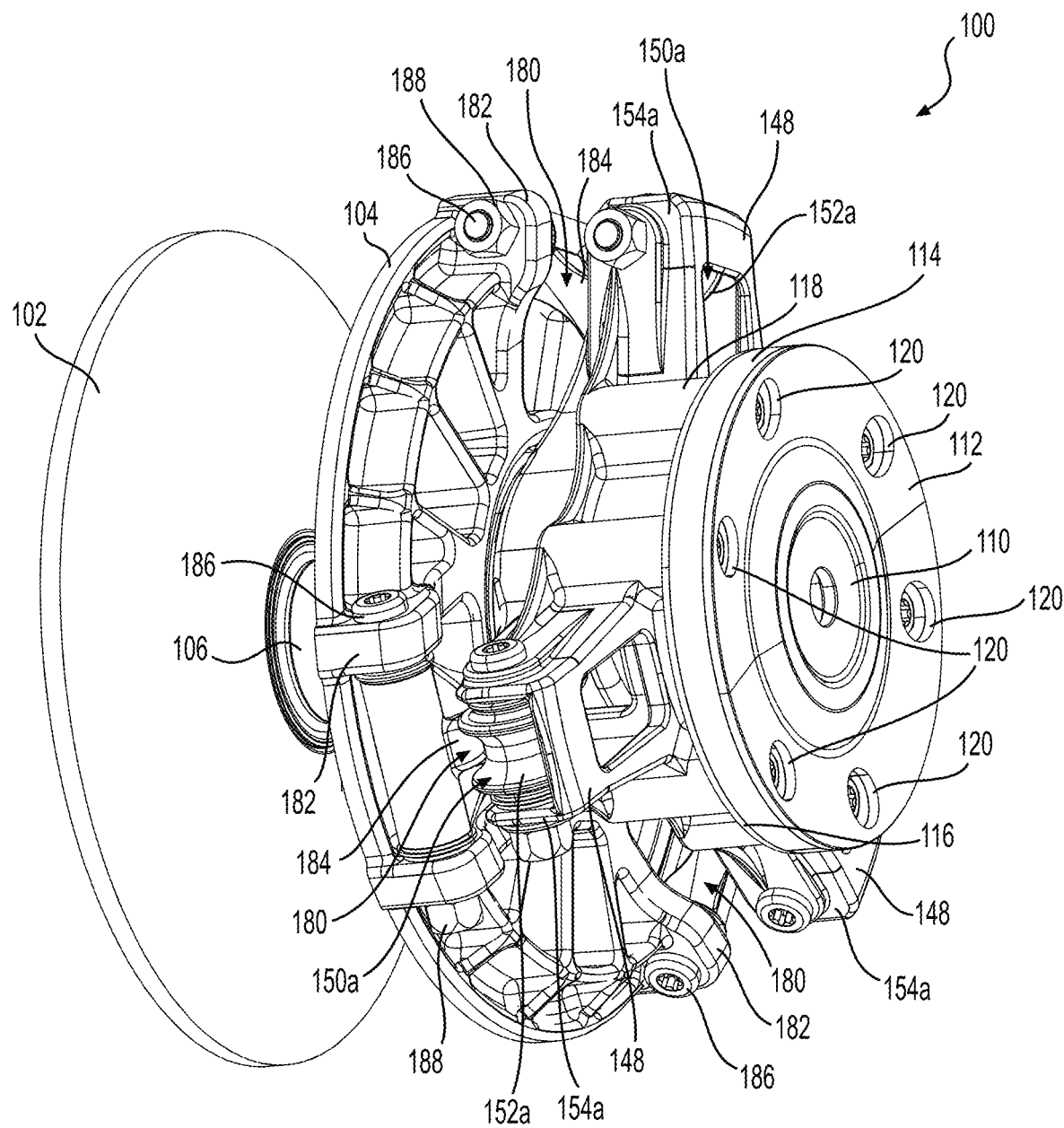
FIG. 3 is a perspective view, taken from a bottom, front, left side of a primary pulley of a CVT of the powertrain of FIG. 2, with the primary pulley in an open position.
Figure 6:
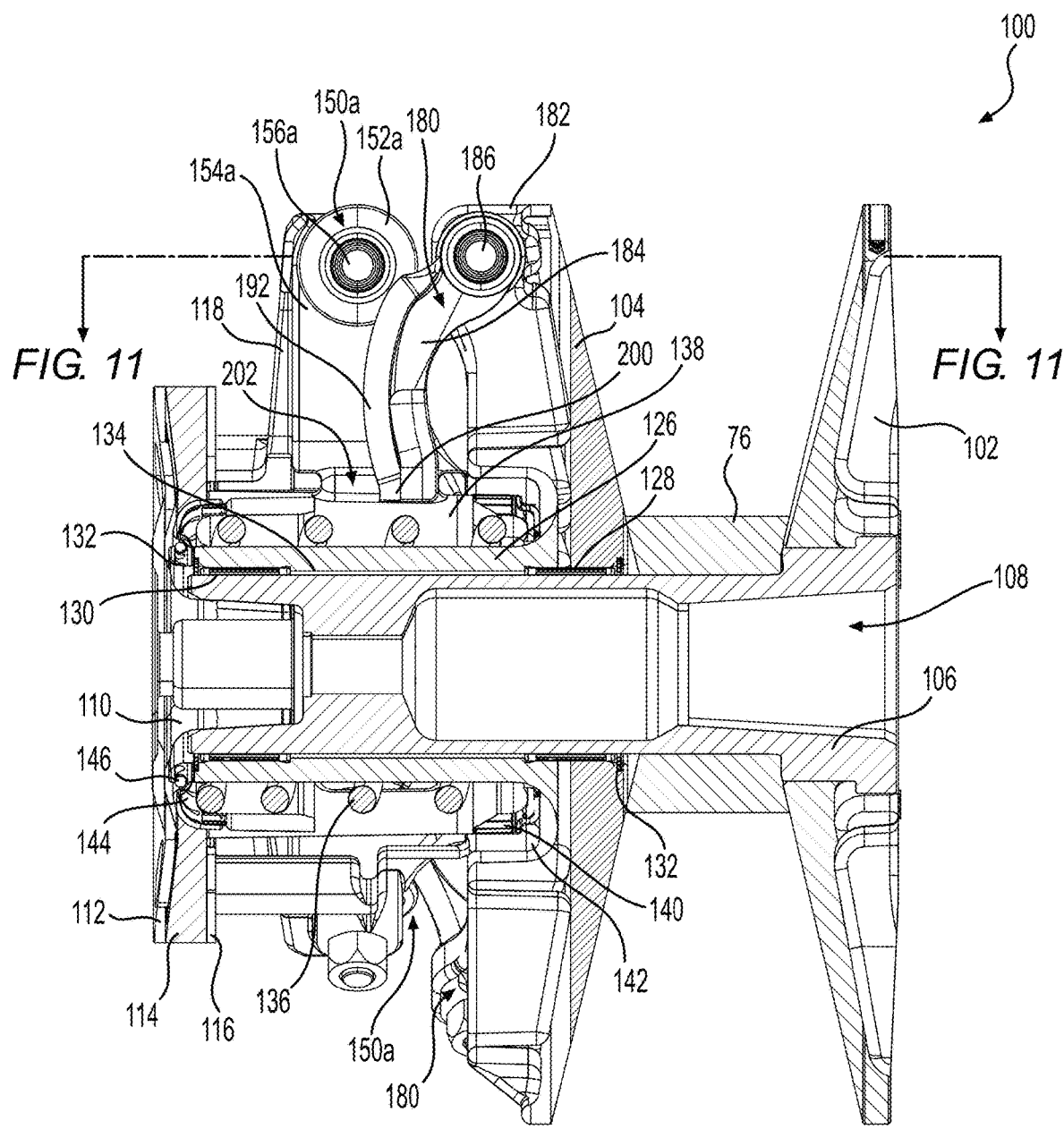
FIG. 6 is a cross-sectional view of the primary pulley of FIG. 3 taken through cross-section line 6-6 of FIG. 5, with a drive belt and the primary pulley in the open position.

Referring to FIG. 3, the fixed sheave 102 is mounted on a fixed sheave shaft 106. The fixed sheave 102 is press-fitted on the fixed sheave shaft 106 such that the fixed sheave 102 rotates with the fixed sheave shaft 106. It is contemplated that the fixed sheave 102 could be connected to the fixed sheave shaft 106 in other known manners to make the fixed sheave 102 rotationally and axially fixed relative to the fixed sheave shaft 106. As can be seen in FIG. 6, the fixed sheave shaft 106 is hollow and has a tapered hollow portion 108. The tapered hollow portion 108 receives the end of the driving shaft therein to transmit torque from the engine 24 to the primary pulley 100. A fastener (not shown) is inserted in the outer end (i.e. the left side with respect to FIG. 6) of the primary pulley 100, inside the fixed sheave shaft 106, and screwed into the end of the driving shaft to prevent axial displacement of the fixed sheave shaft 106 relative to the driving shaft. It is contemplated that the fixed sheave shaft 106 could be connected to the driving shaft in other known manners to make the fixed sheave shaft 106 rotationally and axially fixed relative to the driving shaft. It is also contemplated that the driving shaft could be the fixed sheave shaft 106.

A cap 110 is taper-fitted in the outer end of the fixed sheave shaft 106. The fastener used to connect the driving shaft to the fixed sheave shaft 106 is also inserted through the cap 110 to connect the cap 110 to the fixed sheave shaft 106. It is contemplated that the cap 110 could be connected to the fixed sheave shaft 106 by other means. The radially outer portion of the cap 110 forms a ring 112. An annular rubber damper 114 is connected to the ring 112. Another ring 116 is connected to the rubber damper 114 such that the rubber damper 114 is disposed between the rings 112, 116. As can be seen in FIG. 6, the rubber damper 114 and the ring 116 are disposed radially outward of the fixed sheave shaft 106. In the present implementation, the rubber damper 114 is vulcanized to the rings 112, 116, but it is contemplated that they could be connected to each other by other means such as by using an adhesive. It is also contemplated that the damper 114 could be made of a material other than rubber.

A spider 118 is disposed around the fixed sheave shaft 106 and axially between the ring 116 and the movable sheave 104. The spider 118 is axially fixed relative to the fixed sheave 102. The moveable sheave 104 is disposed axially between the spider 118 and the fixed sheave 102. As can be seen in FIG. 3, six apertures 120 are formed in the ring 112 and the damper 114. The ring 116 has six corresponding apertures (not shown). Six fasteners 122 (FIG. 4) are inserted through the apertures 120, through the ring 116 and into apertures (not shown) of the spider 118 to fasten the ring 116 to the spider 118. As a result, torque is transferred between the fixed sheave shaft 106 and the spider 118 via the cap 110, the rubber damper 114 and the ring 116. The damper 114 dampens the torque variations from the fixed sheave shaft 106 resulting from the combustion events in the engine 24. The spider 118 therefore rotates with the fixed sheave shaft 106.

As can be seen in FIG. 6, a movable sheave shaft 126 integrally formed with the movable sheave 104 is disposed around the fixed sheave shaft 106. In some implementations, the movable sheave 104 could be press-fitted on the movable sheave shaft 126 such that the movable sheave 104 rotates and moves axially with the movable sheave shaft 126. It is contemplated that the movable sheave 104 could be connected to the movable sheave shaft 126 in other known manners to make the movable sheave 104 rotationally and axially fixed relative to the shaft 126. The moveable sheave 104 has ribs 127 (FIG. 4) extending radially between the moveable sheave shaft 126 and the circular edge of the moveable sheave 104. Two bushings 128, 130 (FIG. 6) are disposed radially between and abut the movable sheave shaft 126 and the fixed sheave shaft 106. The bushings 128, 130 are disposed near opposite ends of the movable sheave shaft 126. Clips 132 disposed on either sides of each of the bushings 128, 130 prevent the bushing 128, 130 from moving axially relative to the movable sheave shaft 126. As such, as the movable sheave 104, and therefore the movable sheave shaft 126, moves axially relative to the fixed sheave shaft 106, the bushings 128, 130 move axially together with the movable sheave shaft 126 and therefore move axially relative to the fixed sheave shaft 106. The bushings 128, 130 are made of a relatively low friction material thereby permitting easy axial movement of the movable sheave shaft 126 along the fixed sheave shaft 106. Examples of low friction material include, but are not limited to, brass and polyoxymethylene.

As can also be seen in FIG. 6, an annular space 134 is defined between the bushings 128, 130, the movable sheave shaft 126 and the fixed sheave shaft 106. As can be seen, no component of the primary pulley 100 is disposed inside this annular space 134. As such, the annular space 134 extends continuously between the bushings 128, 130. Therefore, the construction of the illustrated implementation allows the length of the bushings 128, 130 in the axial direction to be selected in order to achieve a desired balance between the amount of friction generated by the bushings 128, 130 in the axial direction and their resistance to wear. For example, the bushings 128, 130 could be longer than illustrated. It is also contemplated that a single bushing or more than two bushings could be provided radially between the shafts 106, 126.

Figure 8:
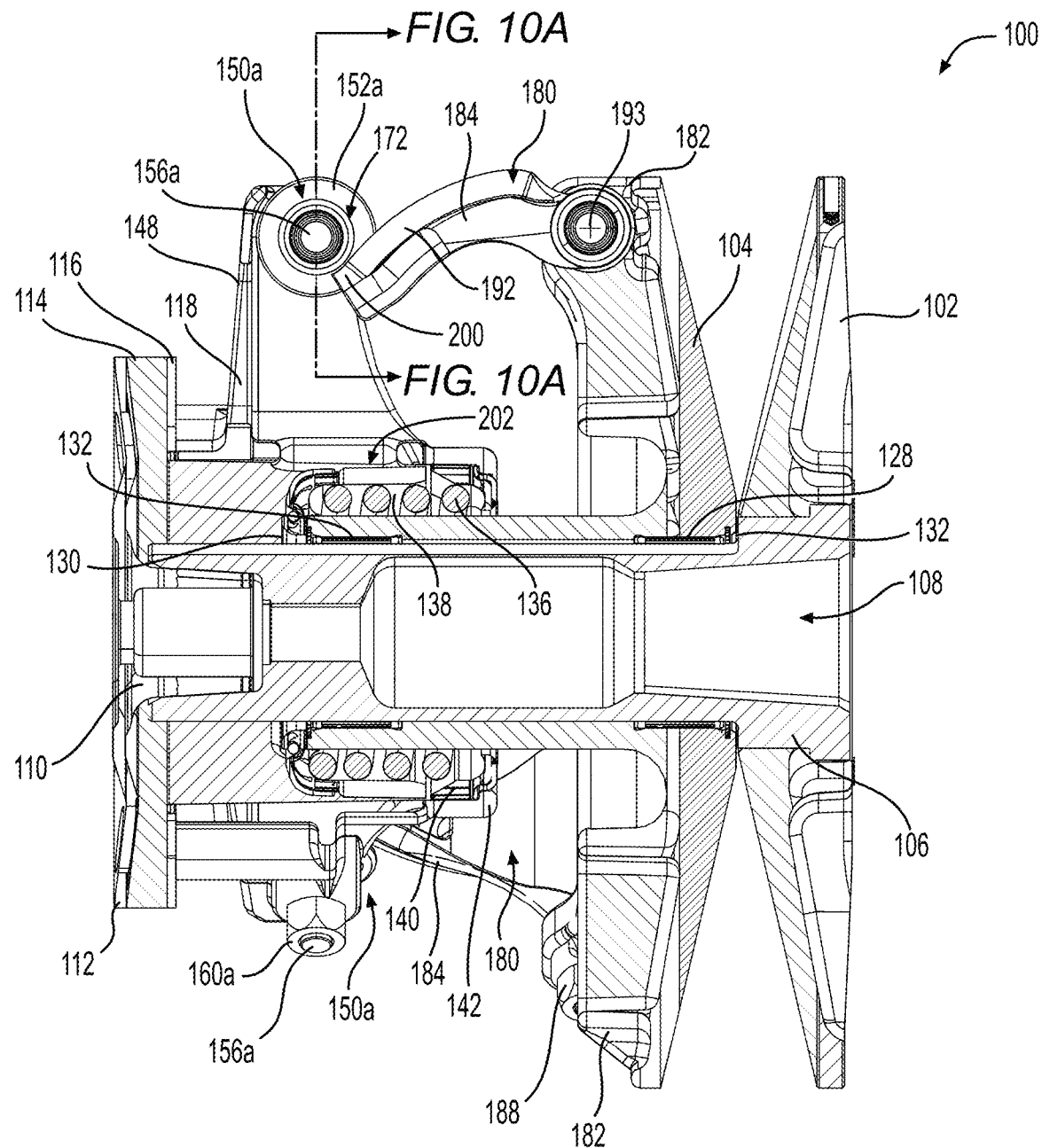
FIG. 8 is a cross-sectional view of the primary pulley of FIG. 3 taken through cross-section line 8-8 of FIG. 7, with a drive belt and the primary pulley in the closed position.

As can be seen in FIG. 6, a biasing member in the form of a coil spring 136 is disposed inside a cavity 138 defined radially between the movable sheave shaft 126 and the spider 118. At one end, the spring 136 abuts a fixed spring seat 140. The spring 136 biases the fixed spring seat 140 against a lip 142 of the spider 118, and therefore the fixed spring seat 140 is axially fixed relative to the spider 118. At the opposite end, the spring 136 abuts a movable spring seat 144. The movable spring seat 144 is held in place near the end of the movable sheave shaft 126 by the spring 136 and a C-clip 146 engaging the movable sheave shaft 126, thereby making the movable spring seat 144 axially fixed relative to the movable sheave shaft 126. As a result, this end of the spring 136 (i.e. the left end with respect to FIG. 6) and the movable spring seat 144 move axially relative to the fixed sheave shaft 106 when the movable sheave 104 and the movable sheave shaft 126 move axially. As the movable sheave 104 and the movable sheave shaft 126 move axially toward the fixed sheave 102, the spring 136 gets compressed as can be seen in FIG. 8. The spring 136 biases the movable sheave 104 and the movable sheave shaft 126 away from the fixed sheave 102 toward their position shown in FIG. 6. It is contemplated that, in some implementations, the movable sheave 104 could be biased away from the fixed sheave 102 by mechanisms other than the spring 136. As can be seen in FIGS. 6 and 8, the bushing 128 is disposed axially between the spring 136 and the fixed sheave 102, and the bushing 130 is disposed axially between the ends of the spring 136.

Figure 9:
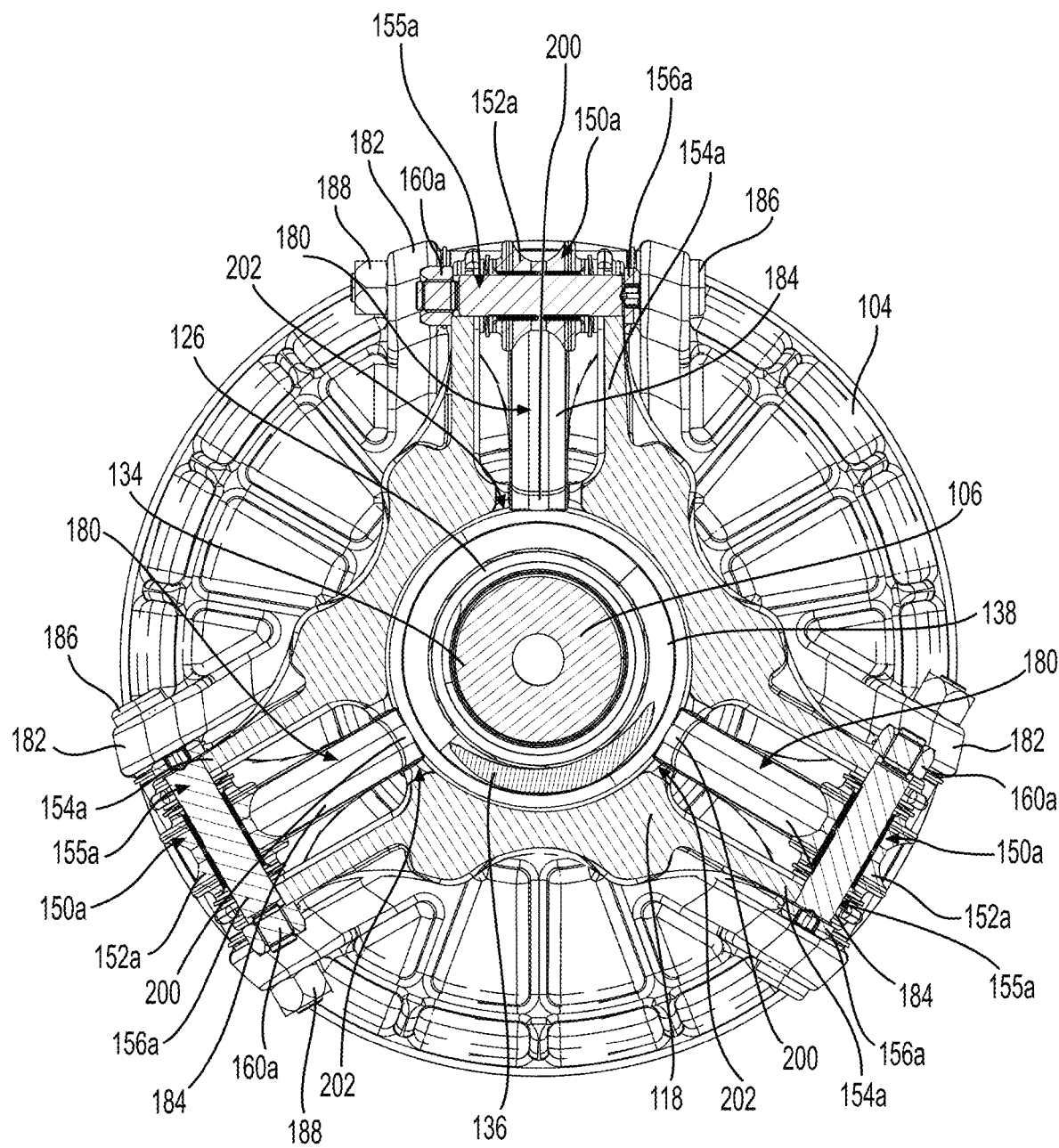
FIG. 9 is a cross-sectional view of the primary pulley of FIG. 3 taken through cross-section line 9-9 of FIG. 5, with the primary pulley in the open position.
Figure 10A:
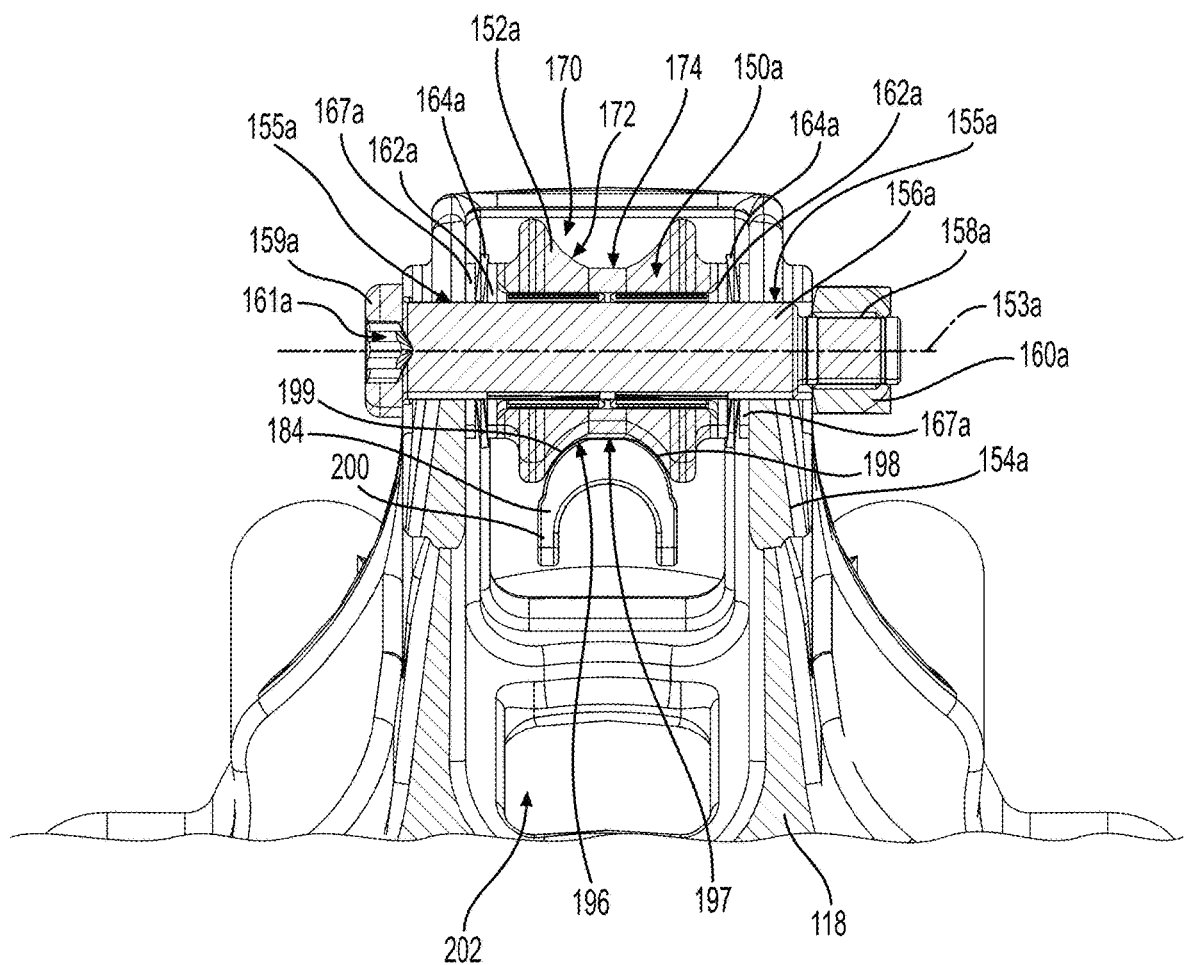
FIG. 10A is a close-up cross-sectional view of a roller assembly and an arm of the primary pulley of FIG. 3 taken through cross-section line 10A-10A of FIG. 8, with a moveable sheave omitted.

Referring to FIGS. 3, 4, 9 and 11, the spider 118 has three legs 148 disposed at 120 degrees from each other. Three roller assemblies 150a are rotatably connected to the three legs 148 of the spider 118. The three roller assemblies 150a are received in a respective bracket 154a formed by each leg 148 of the spider 118. As such, the roller assemblies 150a are disposed radially outward of the fixed and movable sheave shafts 106, 126. Each roller assembly 150a has a roller 152a. Each roller 152a is rotatably connected to the bracket 154a via an axle 156a (FIG. 9). Each bracket 154a defines apertures 155a (FIG. 10A). The axle 156a extends through the apertures 155a of the bracket 154a, through the roller 152a and thereby connects the roller assembly 150a to the spider 118. The roller 152a rotates about a rotation axis 153a (FIG. 10A) that is coaxial with the axle 156a.

Figure 11:
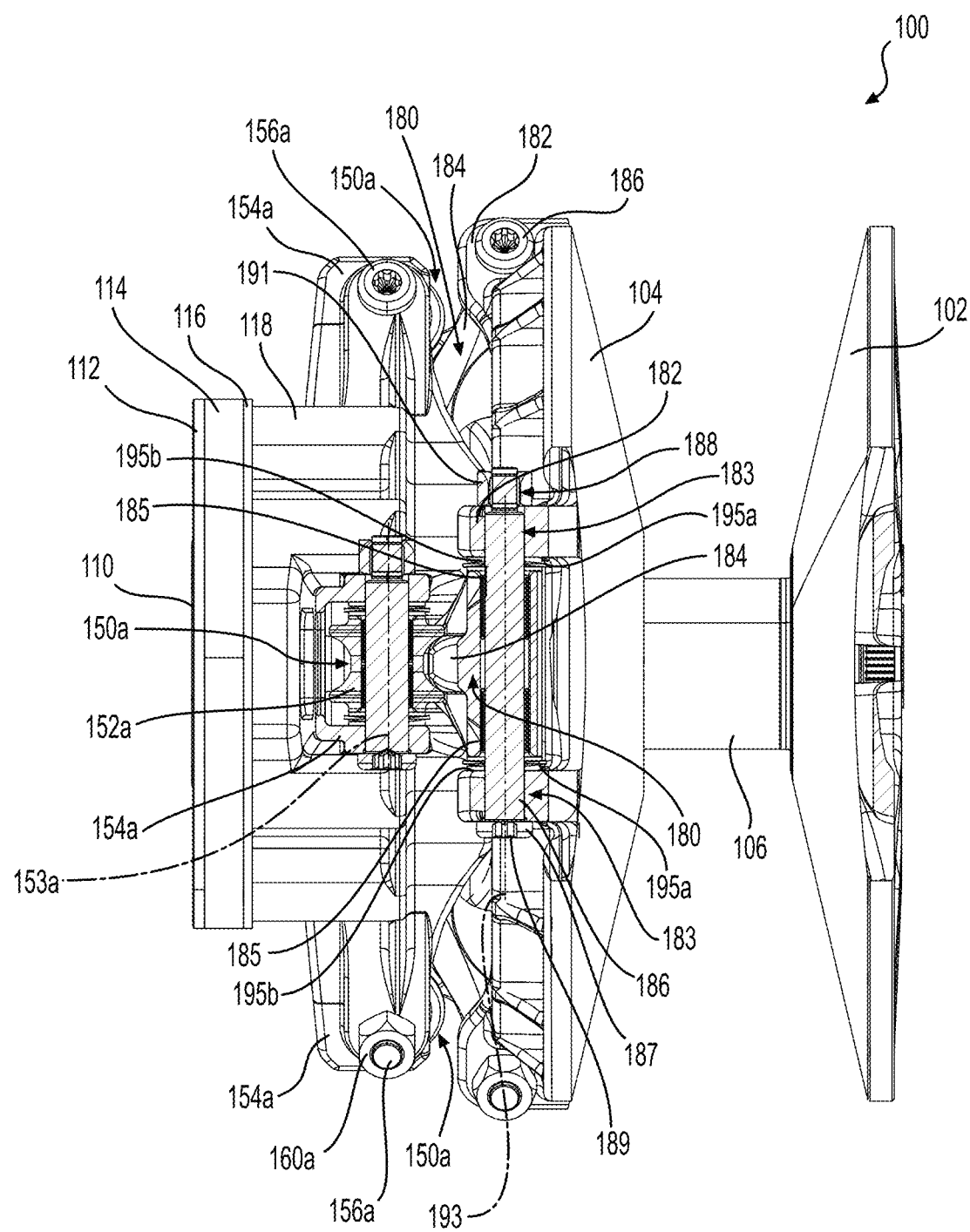
FIG. 11 is a cross-sectional view of the primary pulley of FIG. 6 taken through cross-section line 11-11 of FIG. 6.

Referring to FIGS. 9, 10A and 11, each axle 156a has a threaded outer portion 158a and a head 159a with an aperture 161a defined therein for receiving a tool. The head 159a abuts on an exterior side of the bracket 154. A nut 160a engages the threaded outer portion 158a and abuts the exterior side of the bracket 154. Two bushings 162a are disposed radially between the axle 156a and the roller 152a. The roller 152a is spaced between the interior sides of the bracket 154a as the bushings 162a extend therebetween. The two bushings 162a are made of a relatively low friction material. In other implementations, needle bearings or ball bearings could be disposed radially between the axle 156a and the roller 152a. Disk springs 164a are disposed on either sides of the roller 152a, between washers 167a and the bushings 162a. The disk springs 164a compress the bushings 162a towards each other and maintain the roller 152a generally centered in the bracket 154a.

Figure 12:
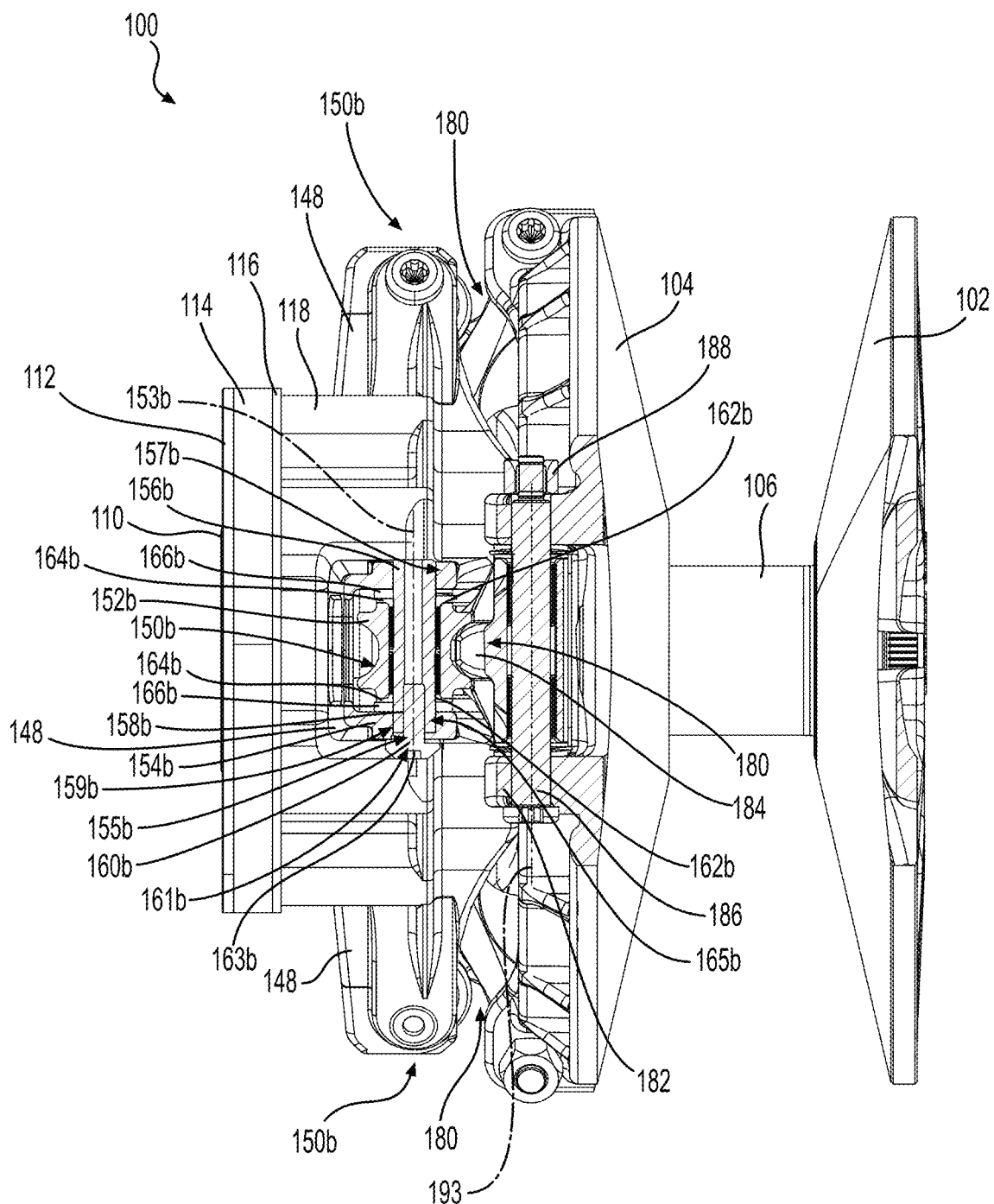
FIG. 12 is a cross-sectional view of an alternative implementation of the primary pulley of FIG. 11, with the alternative implementation of the primary pulley in an open position.

Referring to FIG. 12, there is shown an alternative implementation of the primary pulley 100 having a roller assembly 150b that is an alternative configuration of the roller assembly 150a. The roller assembly 150b includes a roller 152b. The roller 152b is similar to the roller 152a, but could differ in some implementations. Each roller 152b is rotatably connected to a bracket 154b formed by each leg 148 of the spider 118 via an axle 156b. Each bracket 154b defines apertures 155b, 157b (FIG. 12). The bracket 154b defines a step 159b near the aperture 155b on an interior side of the bracket 154b. The axle 156b is hollow and has a threaded inner portion 158b. The axle 156b extends in the bracket 154b, through the roller 152b and through the aperture 157b. An end 165b of the axle 156b abuts on the step 159b. A screw 160b extends through the aperture 155b and engages the threaded inner portion 158b of the axle 156b. The screw 160b has a head 161b with an aperture 163b defined therein for receiving a tool. As the screw 160b is engaged in the threaded inner portion 158b, the head 161b abuts the exterior side of the bracket 154b and the end 165b of the axle 156b abuts the step 159b, thereby connecting the axle 156b to the bracket 154b of the spider 118.

Still referring to FIG. 12, the roller 152b rotates about a rotation axis 153b that is coaxial with the axle 156b. Two bushings 162b are disposed radially between the axle 156b and the roller 152. The two bushings 162b have flanges 164b abutting on the sides of the roller 152b. As a result, the sides of the roller 152b are spaced from the bracket 154b. The two bushings 162b are made of a relatively low friction material. In other implementations, needle bearings or ball bearings could be disposed radially between the axle 156b and the roller 152b. Annular members 166b are disposed on either sides of the roller 152b, between the two bushings 162b and the bracket 154b. In this implementation, axial movements of the roller 152b along the axle 156b are allowed. In some implementations, the annular members 166b are made of a wear-resistant plastic material and the roller 152b is generally centered in the bracket 154b by the annular members 166b. In some implementations, the bracket 154b does not define a step 159b and the threaded inner portion 158b extends throughout the length of the axle 156b and two screws 160b engage the threaded inner portion 158b at opposite ends of the axle 156b. The other elements of the primary pulley 100 shown in FIG. 12 are the same as those of the primary pulley 100 shown in FIGS. 3 to 11. For simplicity, these have been labeled with the same reference numerals and will not be described again in detail.

Referring back to FIGS. 9 to 11, each roller 152a has a track portion 170 having an outer profile 172. The outer profile 172 of the track portion 170 is concave. As best seen in FIG. 10A, a cross section of the outer profile 172 of the track portion 170 of the roller 152a, taken along a plane containing the rotation axis 153a of the roller 152a such as in FIG. 10A, has a generally parabolic shape with a flat center portion 174. Other configurations of the outer profile 172 are contemplated as will be described below.

Referring to FIGS. 3 to 9, three centrifugal actuators 180 are pivotally connected to three brackets 182 integrally formed in the movable sheave 104. As best seen in FIG. 9, the centrifugal actuators 180 are disposed at 120 degrees from each other. As such, the centrifugal actuators 180 are disposed radially outward of the fixed and movable sheave shafts 106, 126. Each centrifugal actuator 180 is aligned with a corresponding one of the roller assemblies 150a. Generally described, the engagement of each centrifugal actuator 180 with its corresponding roller assembly 150a makes the spider 118 and the movable sheave 104 rotationally fixed relative to each other, as will be described further below. As such, the centrifugal actuators 180 remain aligned with their corresponding roller assemblies 150a when the shafts 106, 126 rotate. It is contemplated that the roller assemblies 150a could be connected to the brackets 182 and that the centrifugal actuators 180 could be connected to the brackets 154a of the legs 148 of the spider 118. It is also contemplated that there could be more or less than three centrifugal actuators 180, in which case there would be a corresponding number of legs 148, roller assemblies 150a and brackets 154a, 182.

Figure 10B:
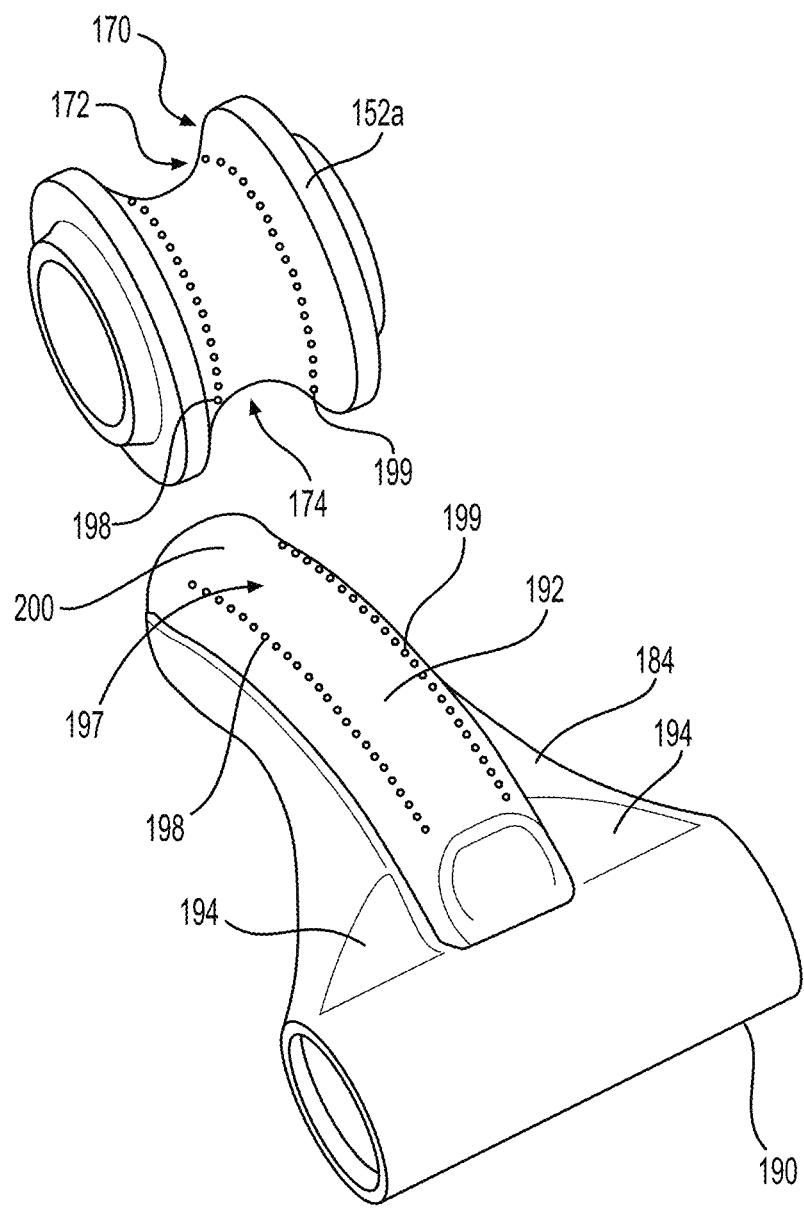
FIG. 10B is a perspective view, taken from a top, front, left side, of an arm and a roller of the primary pulley of FIG. 3, with schematic markings of the contact points between the arm and the roller when assembled in the primary pulley of FIG. 3.

Referring to FIGS. 10B and 11, each bracket 182 defines apertures 183. Each centrifugal actuator 180 includes an arm 184 that pivots about a pin 186 connected to a corresponding bracket 182. The pin 186 has at one end a head 187 with an aperture 189 defined therein for receiving a tool, and at the other end a threaded outer portion 188. The arm 184 includes a hollow cylindrical portion 190 (FIG. 10B). Two bushings 185 are disposed radially between the pin 186 and the hollow cylindrical portion 190 of the arm 184. The two bushings 185 are made of a relatively low friction material. Disk springs 195a are disposed on either sides of the cylindrical portion 190, between washers 195b and the bushings 185. The disk springs 195a compress the bushings 185 towards each other and maintain the arm 184 generally centered in the bracket 182. In other implementations, needle bearings or ball bearings could be disposed radially between the pin 186 and the hollow cylindrical portion 190 of the arm 184. The pin 186 extends through the apertures 183, through the hollow cylindrical portion 190 of the arm 184, and a nut 191 is engaged to the threaded outer portion 188, thereby pivotally connecting the arm 184 to the bracket 182 of the moveable sheave 104. The arm 184 pivots about a pivot axis 193 (FIGS. 8 and 11) that is coaxial with the pin 186. A thrust portion 192 extends perpendicularly to the hollow cylindrical portion 190. In the present implementation, the hollow cylindrical portion 190 and the thrust portion 192 are integrally formed, but other implementations where the hollow cylindrical portion 190 is perpendicularly connected or bonded to the thrust portion 192 are contemplated. Integrally formed webs 194 extend on either sides of the thrust portion 192 and further connect the thrust portion 192 to the hollow cylindrical portion 190.

The thrust portion 192 of the arm 184 has an outer profile 196 (FIG. 10A) that is complementary to the outer profile 172 of the track portion 170 of the roller 152a. The outer profile 196 of the thrust portion 192 of the arm 184 is convex. As best seen in FIG. 10A, a cross section of the outer profile 196 of the thrust portion 192 of the arm 184, taken along a plane that is parallel to the pivot axis 193 (FIG. 8) of the arm 184 such as in FIG. 10A, has a generally parabolic shape with a flat center portion 197. As best seen in FIG. 10A, the thrust portion 192 has a cross section defining an inverted U-shape on a portion of its length along the radial direction of the primary pulley 100. As such, and as illustrated in FIGS. 10A and 10B, the thrust portion 192 of the arm 184 has two contact points 198, 199 with the track portion 170 of the roller 152a. In some implementations, the thrust portion 192 of the arm 184 has more than two contact points with the track portion 170 of the roller 152a. In some implementations, the two contact points 198, 199 are two lines of contact, or surfaces of contact made of multiple contact points. Other configurations of the outer profiles 172, 196 are contemplated. For instance, the cross section of the outer profiles 172, 196 could be semi-circular. In some implementations, the cross section of the outer profile 172 could be convex and the cross section of the outer profile 196 could be concave.

Referring to FIG. 8, the thrust portion 192 of the arm 184, as viewed in a plane perpendicular to the pivot axis 193 such as in FIG. 8, is longitudinally curved along the radial direction of the primary pulley 100. The thrust portion 192 of the arm 184 can be shaped to provide axial displacement of the moveable sheave 104 at a constant or varying rate as the arm 184 is pivoted away from the moveable sheave 104. When the arm 184 is fully pivoted away from the moveable sheave 104, as illustrated in FIG. 8, the thrust portion 192 has an end portion 200 that engages the track portion 170 of the roller 152a. The end portion 200 is flat along the radial direction of the primary pulley 100. Since the thrust portion 192 has a cross section defining an inverted U-shape on a portion of its length, as described above, the end portion 200 of the arm 184 is hollow. Other configurations of the thrust portion 192 and of the end portion 200 of the arm 184 are contemplated.

Referring to FIGS. 6 to 9, the spider 118 defines three apertures 202 aligned with the roller assemblies 150a and the centrifugal actuators 180. The end portion 200 of each arm 184 extends through its corresponding aperture 202 at least when the moveable sheave 104 is fully axially moved away from the fixed sheave 102, i.e. when the primary pulley 100 is in an open position.

Figure 4:
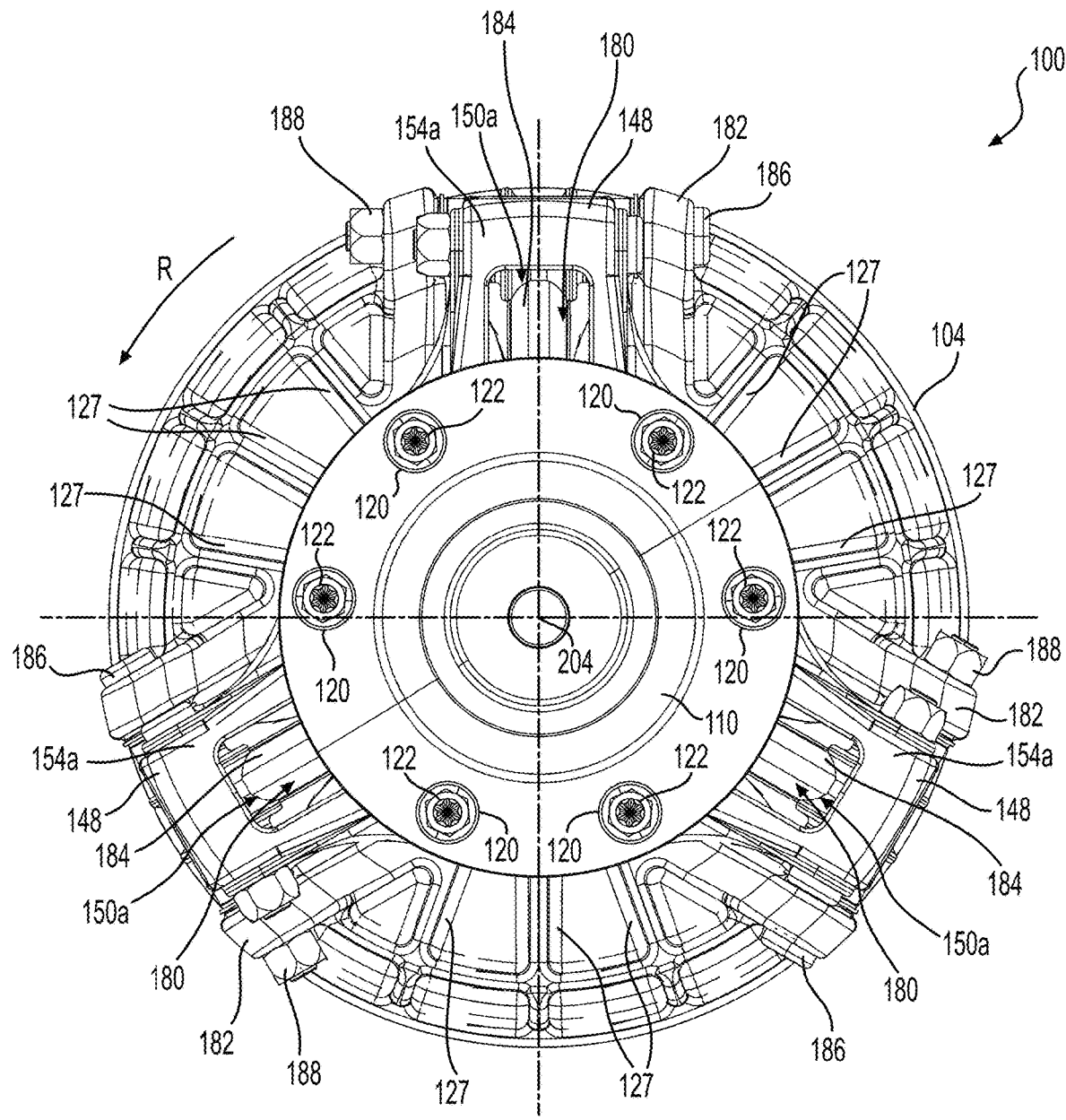
FIG. 4 is a left side elevation view of the primary pulley of FIG. 3, with the primary pulley in the open position.
Figure 5:
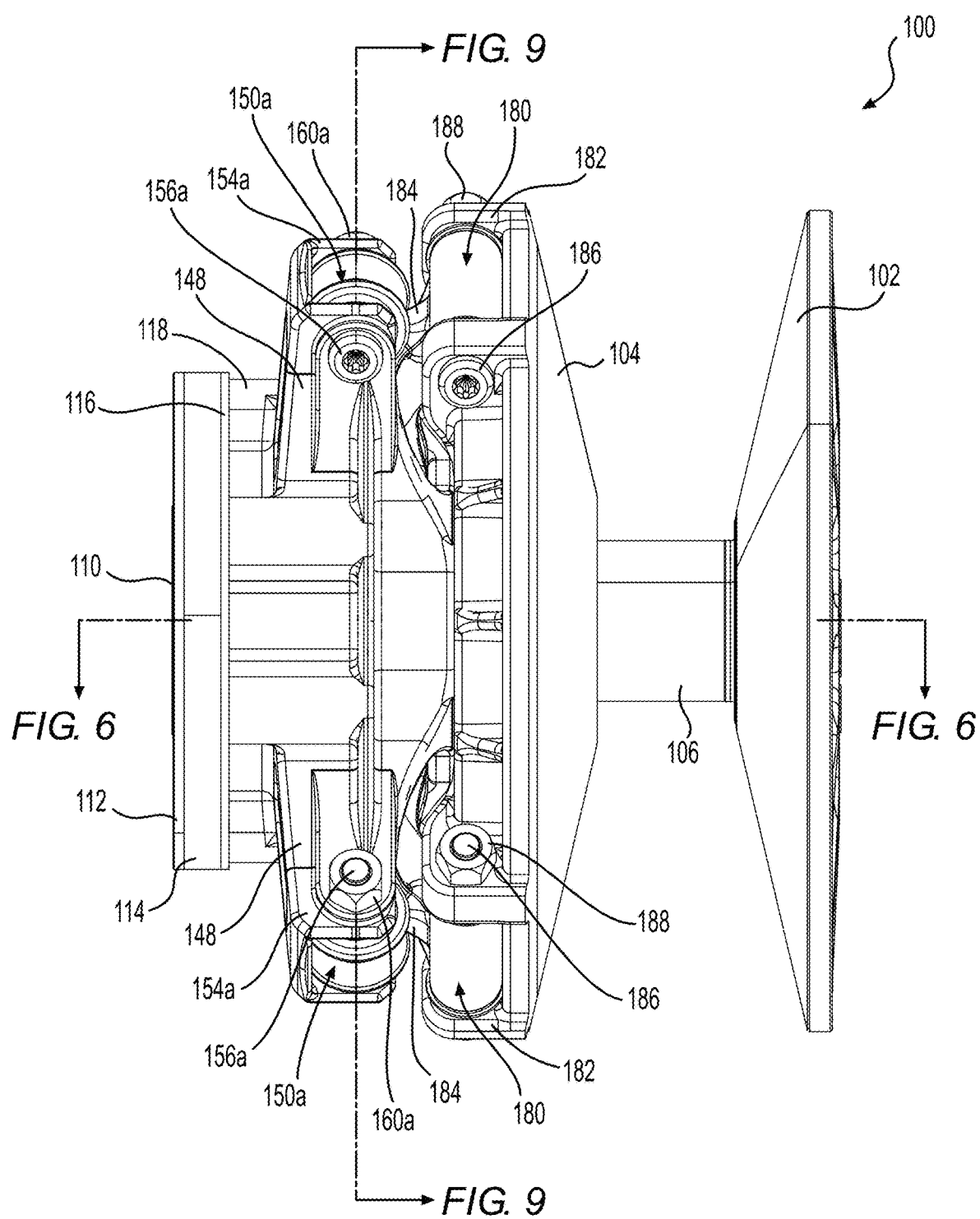
FIG. 5 is a bottom plan view of the primary pulley of FIG. 3, with the primary pulley in the open position.

A general operation of the primary pulley 100 will now be described. Referring to FIG. 4, in operation, the primary pulley 100 rotates about axis of rotation 204 in the direction of arrow R, that is counter-clockwise with respect to FIG. 4. When the driving shaft is not turning or is turning at low speeds, the primary pulley 100 is in the configuration shown in FIGS. 3 to 6. As can be seen in FIG. 6, under these conditions, the end portions 200 of the arms 184 are received in the apertures 202 defined in the spider 118.

When the primary pulley 100 rotates, rotational forces are transferred from the fixed sheave shaft 106 to the spider 118 via the damper 114. The spider 118 includes the roller assemblies 150a which transfer the rotational forces to the movable sheave 104 through the centrifugal actuators 180. For each pair of roller assembly 150a and centrifugal actuator 180, the roller 152a receives the thrust portion 192 of the arm 184 on the track portion 170 such that the thrust portion 192 of the arm 184 remains in contact with the track portion 170 of the roller 152a. As the shapes of the outer profile 172 of the track portion 170 and the outer profile 196 of the thrust portion 192 are complementary, the thrust portion 192 of the arm 184 remains in contact with the track portion 170 of its corresponding roller 152a. As such, the engagement of the arms 184 with the rollers 152a transfer rotational forces between the spider 118 and the moveable sheave 104. This engagement of the arms 184 with the rollers 152a eliminates, or at least minimizes, rotation of the movable sheave 104 relative to the spider 118. As a result, the spider 118 is considered to be rotationally fixed relative to the movable sheave 104.

As the speed of rotation of the driving shaft increases, the speed of rotation of the primary pulley 100 increases with it. As a result, the arms 184 of the centrifugal actuators 180 pivot about their respective pins 186, thereby moving away from the movable sheave 104. As the arms 184 of the centrifugal actuators 180 pivot, each thrust portion 192 engages its corresponding track portion 170 of the roller 152a. The arms 184 transfer axial forces by having their respective thrust portion 192 pushing against the rollers 152a to displace the movable sheave 104 and the movable sheave shaft 126 axially toward the fixed sheave 102. As such, the engagement of the arms 184 with the rollers 152a transfer axial forces between the spider 118 and the moveable sheave 104.

Figure 7:
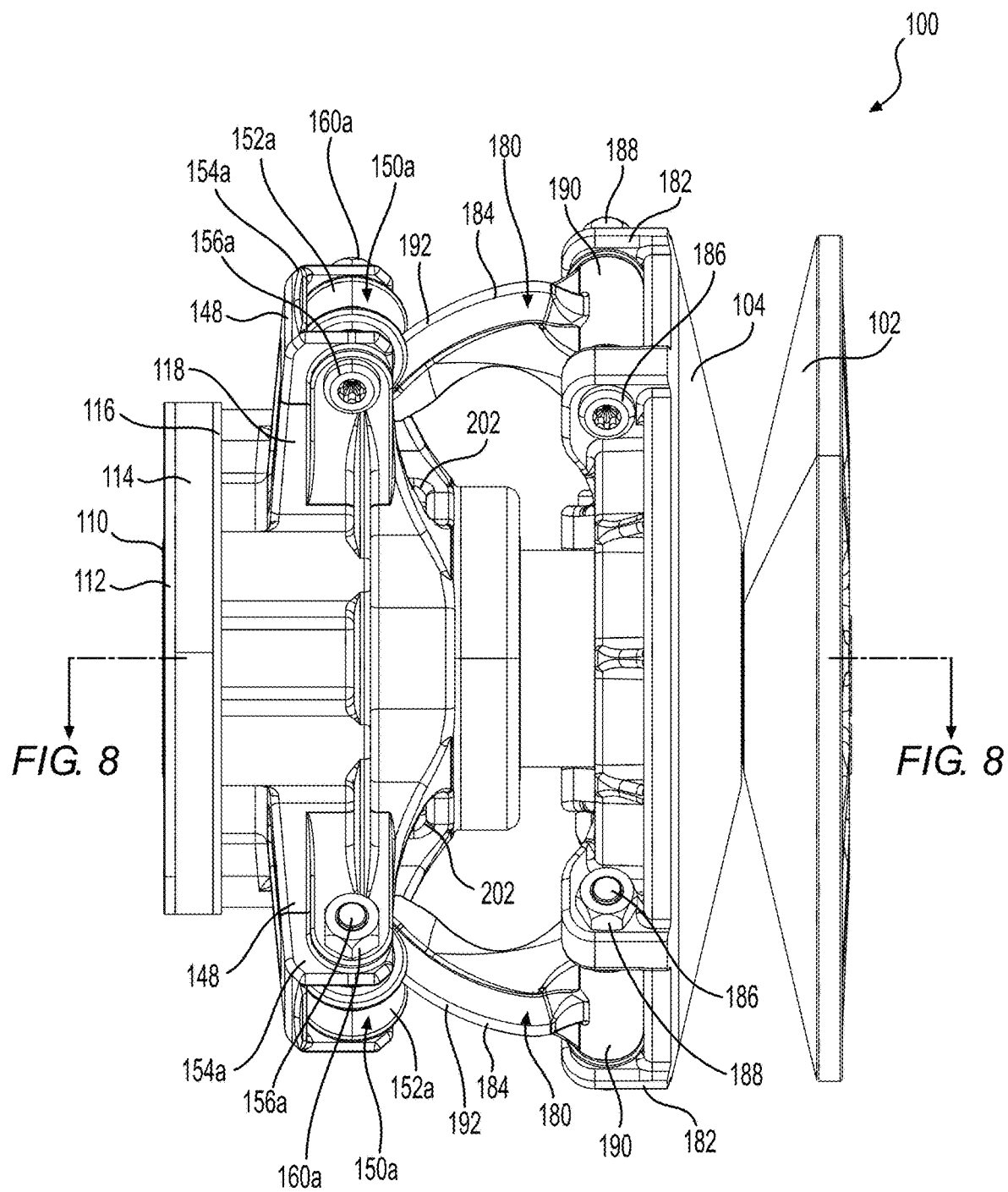
FIG. 7 is a bottom plan view of the primary pulley of FIG. 3, with the primary pulley in a closed position.

When the speed of rotation of the driving shaft is high enough, the movable sheave 104 and the movable sheave shaft 126 move to the position shown in FIGS. 7 and 8, which is as close as the movable sheave 104 can be to the fixed sheave 102. In this position, the end portion 200 of each arm 184 engages the track portion 170 of its corresponding roller 152a (FIG. 8). As the speed of rotation of the driving shaft decreases, the centrifugal actuators 180 pivot back toward the movable sheave 104 and the spring 136 moves the movable sheave 104 and the movable sheave shaft 126 axially away from the fixed sheave 102. At the same time, the arms 184 remain radially engaged with the rollers 152a and continue to transfer the rotational forces between the spider 118 and the moveable sheave 104.

It is contemplated that under certain circumstances, such as when the snowmobile 10 accelerates, the thrust portion 192 of each arm 184 may have one contact point with the track portion 170 of its corresponding roller 152a as one or more parts of the roller assemblies 150a and centrifugal actuators 180 deflect because of the rotational forces provided by the engine 24. As would be understood from FIGS. 4 and 10A, when the snowmobile 10 accelerates, the thrust portion 192 of each arm 184 may only contact the track portion 170 of its corresponding roller 152a at contact point 198. In other circumstances, such as when the snowmobile 10 is driven at a constant speed, the thrust portion 192 of each arm 184 may have the two contact points 198, 199 shown in FIGS. 10A and 10B with its corresponding roller 152a. In some implementations, the thrust portion 192 of the arm 184 remains generally centered on the track portion 170 of the roller 152. In other circumstances, such as when the snowmobile 10 decelerates, the thrust portion 192 of each arm 184 may only contact the track portion 170 of its corresponding roller 152a at contact point 199. It is also contemplated that in implementations including the annular members 166b described in reference with FIG. 12, axial movement of the roller 152b along its axle 156b is allowed and the roller 152b may be aligned with its corresponding arm 184. This configuration could allow for improved engagement of the arm 184 and roller 152b as they would engage through the two contact points 198, 199 most of the time.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A pulley for a continuously variable transmission comprising:
   a fixed sheave having an axis of rotation;
   a movable sheave axially movable relative to the fixed sheave;
   a spider axially fixed relative to the fixed sheave and rotationally fixed relative to the movable sheave, the movable sheave being disposed axially between the spider and the fixed sheave;
   a biasing member biasing the movable sheave axially away from the fixed sheave;
   at least one centrifugal actuator comprising an arm pivotally connected to one of the movable sheave and the spider, the arm pivoting away from the one of the movable sheave and the spider as a speed of rotation of the pulley increases, the arm having a thrust portion, the arm having a first outer profile at the thrust portion; and
   at least one roller assembly comprising a roller rotationally connected to another one of the movable sheave and the spider, the roller having a track portion having a second outer profile complementary to the first outer profile, the thrust portion of the arm of the at least one centrifugal actuator pushing against the track portion of the roller of the at least one roller assembly as the arm pivots away from the one of the movable sheave and the spider, thereby moving the movable sheave axially toward the fixed sheave, the roller receiving the thrust portion of the arm on the track portion such that the thrust portion of the arm remains in contact with the track portion of the roller, the arm and the roller thereby transferring axial and rotational forces between the spider and the movable sheave, a cross section of the first outer profile of the thrust portion of the arm, taken along a first plane parallel to a pivot axis of the arm, being convex, and a cross section of the second outer profile of the track portion of the roller, taken along a second plane containing a rotation axis of the roller, being concave.

2. The pulley of claim 1, wherein the thrust portion of the arm has at least one contact point with the track portion of the roller.

3. The pulley of claim 2, wherein the thrust portion of the arm has two contact points with the track portion of the roller.

4. The pulley of claim 1, wherein the thrust portion of the arm remains generally centered on the track portion of the roller.

5. The pulley of claim 1, wherein:
   the cross section of the first outer profile of the thrust portion of the arm, taken along the first plane parallel to the pivot axis of the arm, has a generally parabolic shape; and
   the cross section of the second outer profile of the track portion of the roller, taken along the second plane containing the rotation axis of the roller, has a generally parabolic shape.

6. The pulley of claim 1, wherein each of the at least one roller assembly further comprises an axle extending through the roller for connecting the at least one roller assembly to the other one of the moveable sheave and the spider.

7. The pulley of claim 6, wherein for each of the at least one roller assembly:
   the axle is a hollow axle having a threaded inner portion; and
   at least one screw engages the threaded inner portion of the axle for connecting the axle to the other one of the moveable sheave and the spider.

8. The pulley of claim 6, wherein for each of the at least one roller assembly:
   the axle has a threaded outer portion; and
   a nut engages the threaded outer portion of the axle for connecting the axle to the other one of the moveable sheave and the spider.

9. The pulley of claim 1, wherein the arm comprises a hollow cylindrical portion perpendicularly connected to the thrust portion.

10. The pulley of claim 9, further comprising a pin extending through the hollow cylindrical portion of the arm for pivotally connecting the arm to the one of the moveable sheave and the spider.

11. The pulley of claim 1, wherein the thrust portion of the arm is longitudinally curved.

12. The pulley of claim 1, wherein the thrust portion has an end portion engaging the track portion of the roller when the arm is fully pivoted away from the one of the movable sheave and the spider.

13. The pulley of claim 12, wherein the spider defines an aperture, and the end portion of the arm extends through the aperture at least when the movable sheave is fully axially moved away from the fixed sheave.

14. The pulley of claim 1, further comprising a damper connecting the fixed sheave to the spider and transferring the rotational forces between the fixed sheave and the spider.

15. The pulley of claim 1, wherein the arm is pivotally connected to the movable sheave, and the roller is rotationally connected to the spider.

16. The pulley of claim 1, wherein:
   the at least one centrifugal actuator is three centrifugal actuators disposed at 120 degrees from each other;
   the at least one roller assembly is three roller assemblies disposed at 120 degrees from each other; and
   each of the three centrifugal actuators is aligned with a corresponding one of the three roller assemblies.

17. The pulley of claim 1, further comprising:
   a fixed sheave shaft connected to the fixed sheave; and
   a movable sheave shaft connected to the movable sheave, the fixed sheave shaft being disposed at least in part inside the movable sheave shaft;
   wherein the movable sheave shaft is disposed at least in part inside the biasing member; and
   wherein the biasing member is disposed at least in part inside the spider.

18. A continuously variable transmission comprising:
   the pulley according to claim 1, the pulley being a primary pulley;
   a secondary pulley having:
      a fixed sheave; and
      a movable sheave axially movable relative to the fixed sheave; and
   a drive belt looped around the fixed and movable sheaves.

19. A vehicle comprising:
   a frame;
   a motor connected to the frame;
   the continuously variable transmission of claim 18, the primary pulley being operatively connected to and driven by the motor;
   a driven shaft connected to and driven by the secondary pulley; and at least one ground engaging member operatively connected to the driven shaft.

* * * * *